US008767056B2

(12) United States Patent
Carpenter (10) Patent No.: US 8,767,056 B2
(45) Date of Patent: Jul. 1, 2014

(54) FLAT-FOLDING DOCUMENT IMAGING APPARATUS

(75) Inventor: Michael D. Carpenter, Arlington, TX (US)

(73) Assignee: Siemens Industry, Inc., Alpharetta, GA (US)

(\*) Notice: Subject to any disclaimer, the term of this patent is extended or adjusted under 35 U.S.C. 154(b) by 407 days.

(21) Appl. No.: 13/038,435

(22) Filed: Mar. 2, 2011

(65) Prior Publication Data

US 2011/0216178 A1  Sep. 8, 2011

Related U.S. Application Data

(60) Provisional application No. 61/310,845, filed on Mar. 5, 2010.

(51) Int. Cl.
*H04N 7/18* (2006.01)

(52) U.S. Cl.
USPC ........................................................... 348/61

(58) Field of Classification Search
USPC ........................................................... 348/61
See application file for complete search history.

(56) References Cited

U.S. PATENT DOCUMENTS

| 4,309,102 | A  | * | 1/1982  | Pudark et al. ............. 399/77    |
| 6,540,415 | B1 | * | 4/2003  | Slatter et al. ............. 396/428  |
| 6,965,460 | B1 | * | 11/2005 | Gann et al. ............... 358/471   |
| 7,269,292 | B2 | * | 9/2007  | Steinberg .................. 382/243  |
| 7,489,862 | B2 | * | 2/2009  | Furuya ....................... 396/86  |
| 2006/0203107 | A1 | * | 9/2006 | Steinberg et al. ........ 348/239 |
| 2008/0079763 | A1 | * | 4/2008 | Abrott ....................... 347/19 |
| 2011/0063322 | A1 | * | 3/2011 | Takabayashi et al. .... 345/619 |
| 2011/0122455 | A1 | * | 5/2011 | Elliot et al. ............... 358/406 |

\* cited by examiner

*Primary Examiner* — Dave Czekaj
*Assistant Examiner* — Leron Beck (57) ABSTRACT

Document imaging apparatuses, systems, and methods. An apparatus includes a base having a platen on a top surface. The apparatus includes a boom having a first end and a second end. The first end is rotatably connected to the base, and the is boom movable between a first position where the second end is above the platen and a second position wherein the boom is stored within the base. The apparatus includes a camera mount located at the second end of the boom. The camera mount is configured to removably attach to a camera so that the camera is located above the platen and positioned to capture an image of the platen.

14 Claims, 5 Drawing Sheets

FLAT-FOLDING DOCUMENT IMAGING APPARATUS

CROSS-REFERENCE TO RELATED APPLICATION

This application claims the benefit of the filing date of U.S. Provisional Patent Application 61/310,845, filed Mar. 5, 2010, which is hereby incorporated by reference.

TECHNICAL FIELD

The present disclosure is directed, in general, to a document imaging apparatus.

BACKGROUND OF THE DISCLOSURE

Inexpensive and effective means for making photographic images of documents are desirable.

SUMMARY OF THE DISCLOSURE

Various disclosed embodiments include document imaging apparatuses, systems, and methods.

Various embodiments include an apparatus includes a base having a platen on a top surface. The apparatus includes a boom having a first end and a second end. The first end is rotatably connected to the base, and the is boom movable between a first position where the second end is above the platen and a second position wherein the boom is stored within the base. The apparatus includes a camera mount located at the second end of the boom. The camera mount is configured to removably attach to a camera so that the camera is located above the platen and positioned to capture an image of the platen.

Various embodiments include a document imaging system. The document imaging system includes a data processing system and a digital camera in communication with and controlled by the data processing system. The document imaging system includes an apparatus having a base with a platen on a top surface. The boom has a first end and a second end, where the first end is rotatably connected to the base and the boom movable between at least a first position wherein the second end is above the platen and a second position wherein the boom is stored within the base. The apparatus includes a camera mount located at the second end of the boom and configured to removably attach to the camera so that the camera is located above the platen and positioned to capture an image of the platen. The digital camera is mounted on the camera mount and positioned to capture an image of a test pattern printed on the platen.

Various embodiments include a method performed by a data processing system. The method includes capturing a test pattern image using a digital camera mounted on a document imaging apparatus. The test pattern image is printed on a platen of the document imaging apparatus. The method includes comparing the captured test pattern image to a reference image stored in the data processing system. The method includes determining a set of image adjustments based on the comparison. The method includes capturing a document image using the digital camera mounted on the document imaging apparatus, and applying the set of image adjustments to the captured document image to produce a corrected document image.

The foregoing has outlined rather broadly the features and technical advantages of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiment disclosed as a basis for modifying or designing other structures for carrying out the same purposes of the present disclosure. Those skilled in the art will also realize that such equivalent constructions do not depart from the spirit and scope of the disclosure in its broadest form.

Before undertaking the DETAILED DESCRIPTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which.

DETAILED DESCRIPTION

FIGS. 1 through 5, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device. The numerous innovative teachings of the present application will be described with reference to exemplary non-limiting embodiments.

Document imaging, including scanning, photography, or other means for producing a digital or photographic image of a document, is typically performed by special-purpose solutions and equipment. This equipment, whether flat-bed or sheet-fed scanners, telecopiers, or other similar devices, are typically relatively sophisticated, delicate, single-purpose designs. These devices can include relatively inexpensive hand-hold contact line scanners, or more expensive devices such as flatbed scanners with motorized optics. These special-purpose solutions are typically dedicated to document scanning, and tend to either provide low-quality images, or be fragile and non-portable in form factor. A "document", as used herein, is intended to be inclusive of text, pictures, paper, photographs, or any other flat article that is to be imaged.

Disclosed embodiments include an apparatus that adapts medium- to high-quality consumer-grade digital cameras, and other cameras, to the purpose of document imaging though an innovative mounting system. Various embodiments include a digital camera in communication with a data processing system that is configured to correct geometric distortions caused by the non-specialized optical systems common to these cameras. Disclosed apparatuses can fold flat for convenient storage and transport, and the associated camera can be used for typical photographic tasks when not mounted to the apparatus for document imaging.

Figure 1:
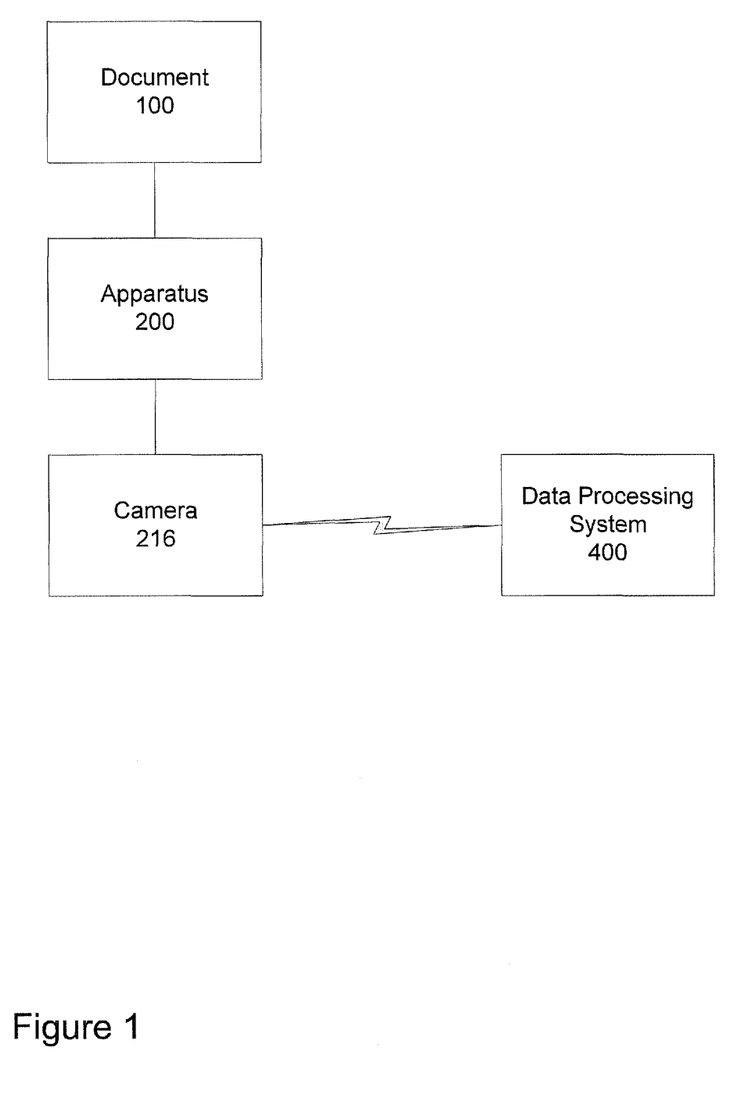
FIG. 1 depicts a simplified block diagram of a document imaging system in accordance with disclosed embodiments.

FIG. 1 depicts a simplified block diagram of a document imaging system in accordance with disclosed embodiments.

A document 100 is placed within apparatus 200, described in more detail below. A camera 216 is mounted on apparatus 200. In some embodiments, the camera can image the documents as a stand-alone system, storing the images until they can be unloaded and processed. In other embodiments, the camera 216 is connected to communicate with data processing system 400, described in more detail below, to perform processes as described herein. The connection between camera 216 and data processing system 400 can be wired or wireless, using connections known to those of skill in the art.

Figure 2:
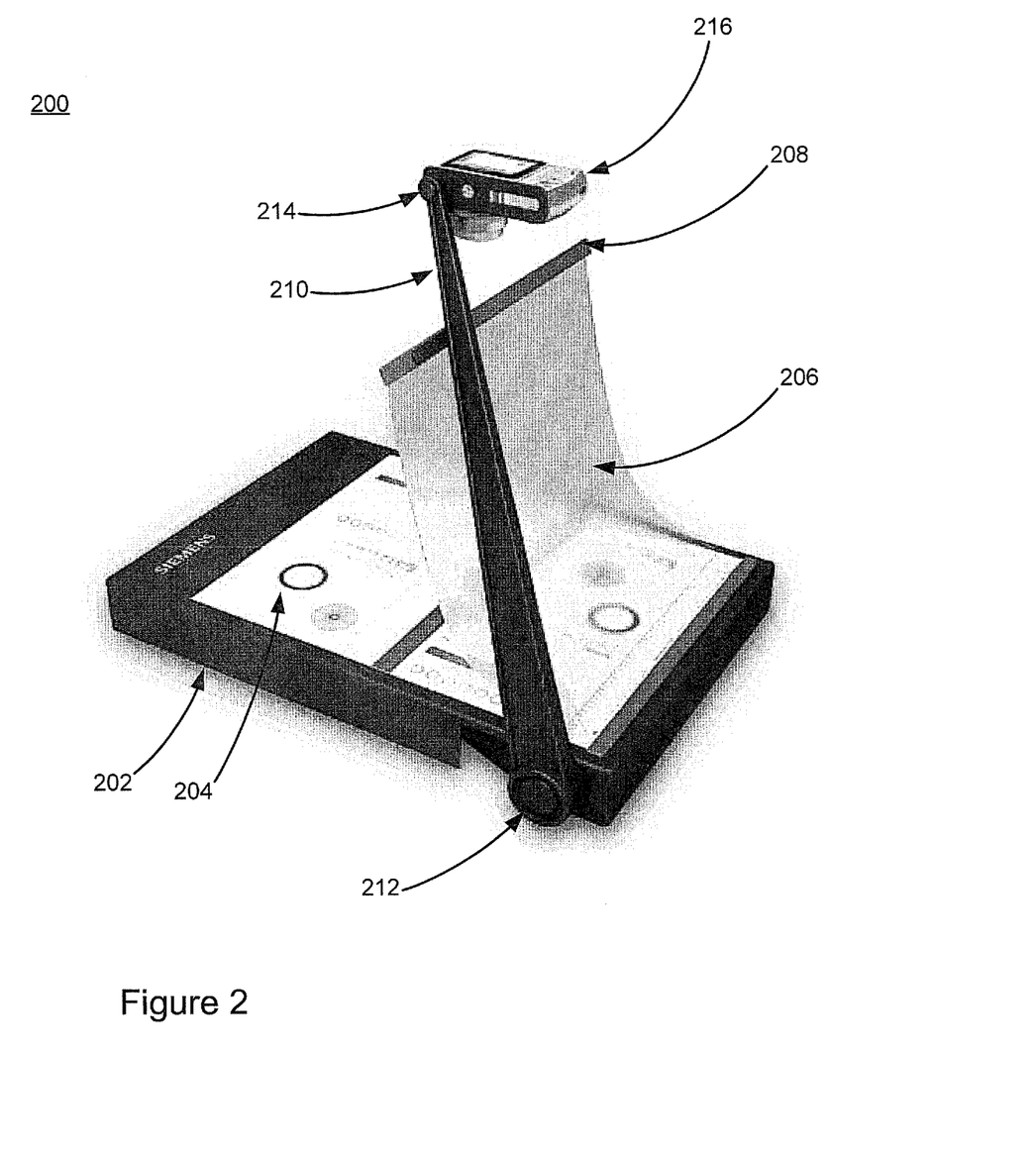
FIG. 2 depicts an apparatus in accordance with disclosed embodiments when positioned for use.

FIG. 2 depicts an apparatus 200 in accordance with disclosed embodiments when positioned for use.

The apparatus 200 includes a base 202. Base 202 can be made of metal or plastic, or a combination of these, and can preferably be of sturdy but lightweight plastic construction. Base 202 preferably has a non-specular surface finish.

At least a portion of a top surface of the 202 forms a document platen 204. Document platen 204 can be printed or marked with a variety of images, including in particular test pattern images used for calibrating a camera for focus, color, sharpness, and other factors, a grid or other guide for properly aligning documents placed on the platen, a plain white, black, or other color background, and others. In some embodiments, the document platen 204 includes a removable platen surface, so that a platen surface having a specific platen image can be placed in the base when desired. In such cases, the removable platen surface can be securely fastened in the base 202 so that it does not move or fall out of the base 202 unintentionally.

Apparatus 200 can include a document cover 206 that can be fastened at one end to the base 202. Document cover 206 is preferably a flexible, non-glass, transparent cover, for example made of a transparent plastic. Preferably, the document cover is non-reflective to visible and/or infrared light and is sized to cover the platen. Document cover 206 is preferably located and sized so that it lays flat across the surface of document platen 204, so that a document on the document platen 204 is held flat by and visible through the document cover 206. In use, a document is placed between platen 205 and document cover 206 with the side to be imaged facing up so it is visible through the document cover 206.

Document cover 206 can be a non-glare transparent film attached at the entire edge of one end of the platen.

Document cover 206 can include an end strip 208 that keeps the document cover 206 flat when laid across the platen 204. End strip 208 can be a magnetic material, and can be magnetically and removably attached to the base 202. If the base 202 is made of plastic, then base 202 or document platen 204 can include a metal or magnetic strip that magnetically engages the end strip 208 when it is laid flat on the document platen 204. End strip 208 can be a ferrous metal weight along the free edge of the platen, and can be attached to a magnet in on the boom 210, described below, to hold the document cover 206 in a raised position to aid in positioning a document on the platen 204.

Apparatus 200 includes a camera support boom 210 that is rotatably attached at a first end to base 202 at hinge 212. Hinge 212 includes a tensioning mechanism to hold boom 210 in place when it is positioned above document platen 204. The tensioning mechanism can be implemented by a tight frictional fit of hinge 212, a spring, a screw, a ratchet mechanism, or other means sufficient to hold the boom 210 in place until a user moves it.

Note that in this embodiment the boom 210 extends from the corner of the base 202 over the platen so that the second end of the boom is substantially above the center of the platen 204.

Boom 210 includes a camera mount 214 at its second end, configured so that a camera 216 can be removably mounted on boom 210. Camera mount 214 can be, for example, a standard camera case screw, such as a ¼" British Standard Whitworth (BSW) used on almost all small cameras. Camera mount 214 is positioned on the second end of boom 210 so that a mounted camera 216, when the boom is raised, can be securely pointed down at the document platen 204, document cover 206, and any documents between them. Preferably, the camera mount 214 and boom 210 can be positioned so that the camera 216 is positioned directly over and orthogonal to the platen 204 and positioned to capture an image of the platen and any document placed on the platen.

Boom 210 rotates about hinge 212 to one or more raised positions to position camera 216 to take pictures of any documents on document platen 204 or between document platen 204 and document cover 206. Boom 210 rotates about hinge 212 to stow in one or more storage positions for storage. Storage positions can include positioning the boom 210 alongside base 202, or positioning the boom 210 under or within the base 202. From the perspective of FIG. 2, if the boom 210 is to be positioned to be stored along the nearer side of the base 202, it can be configured to rotate to the left to lie alongside the base, and is flexible enough to straighten and stow in this position. In other embodiments, also from the perspective of FIG. 2, if the boom 210 is to be stored under and within the base 202, it can be configured to rotate to the right until it is disposed under and within base 202. In some cases, not only is hinge 212 configured to allow boom 210 to rotate with respect to base 202, it can also be configured to allow boom 210 to fold under or into the base 202.

Camera 216 can be any camera, including digital or film cameras. In some specific embodiments, the camera 216 is a commercial off-the-shelf digital camera, such as one having a 10 megapixel imaging capability, and the capability of being connected to a data processing system 400 as described herein (connection not shown in this figure for purposes of clarity).

According to various embodiments, the apparatus allows a consumer grade pocket camera to capture images with adequate quality for automatic authorship identification. An apparatus and system as disclosed herein can, in various embodiments, maintaining precise orthogonality between the camera and the document platen, provide a stable, even means of mounting documents during image capture, enable automatic image registration in camera alignment, and eliminate optical distortions automatically in image pre-processing.

According to various embodiments disclosed herein, when a test pattern image is used as the platen image, the system can use the test pattern, or other platen image such as grid guides, to automatically detect the proper alignment and skew of the document being imagined. The system can automatically compare a reference scan of a target document to a second scan of the target document such that any distortions in the image can be characterized and corrected. The test pattern image or other platen image can be used by the system to ensure that the camera is properly aligned over the platen, or to store mounting characteristics so that any skew or distortion in the images can be automatically corrected.

Figure 3:
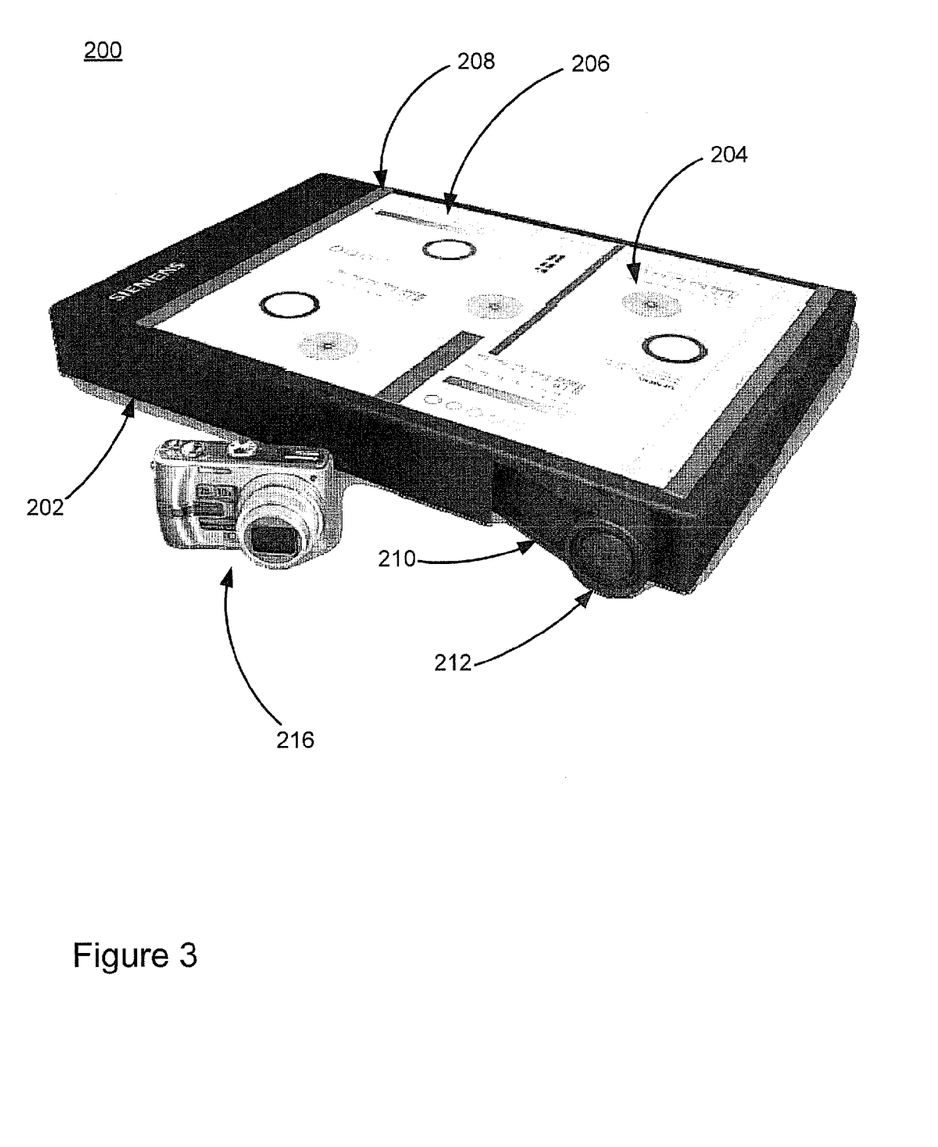
FIG. 3 depicts an apparatus in accordance with disclosed embodiments when positioned for storage or transport.

FIG. 3 depicts apparatus 200 in accordance with disclosed embodiments when positioned for storage or transport.

In this example, camera 216 is detached from the boom 210. Boom 210 has been rotated about hinge 212 so that it is stored under and within the base 202. Document cover 206 lays flat on document platen 204, and end strip 208 is magnetically secured to the base 202. A test pattern image is shown on platen 204, visible through the transparent document cover 206.

In other embodiments, a handle can be added to a side or end of apparatus 200 for easy transport.

Figure 4:
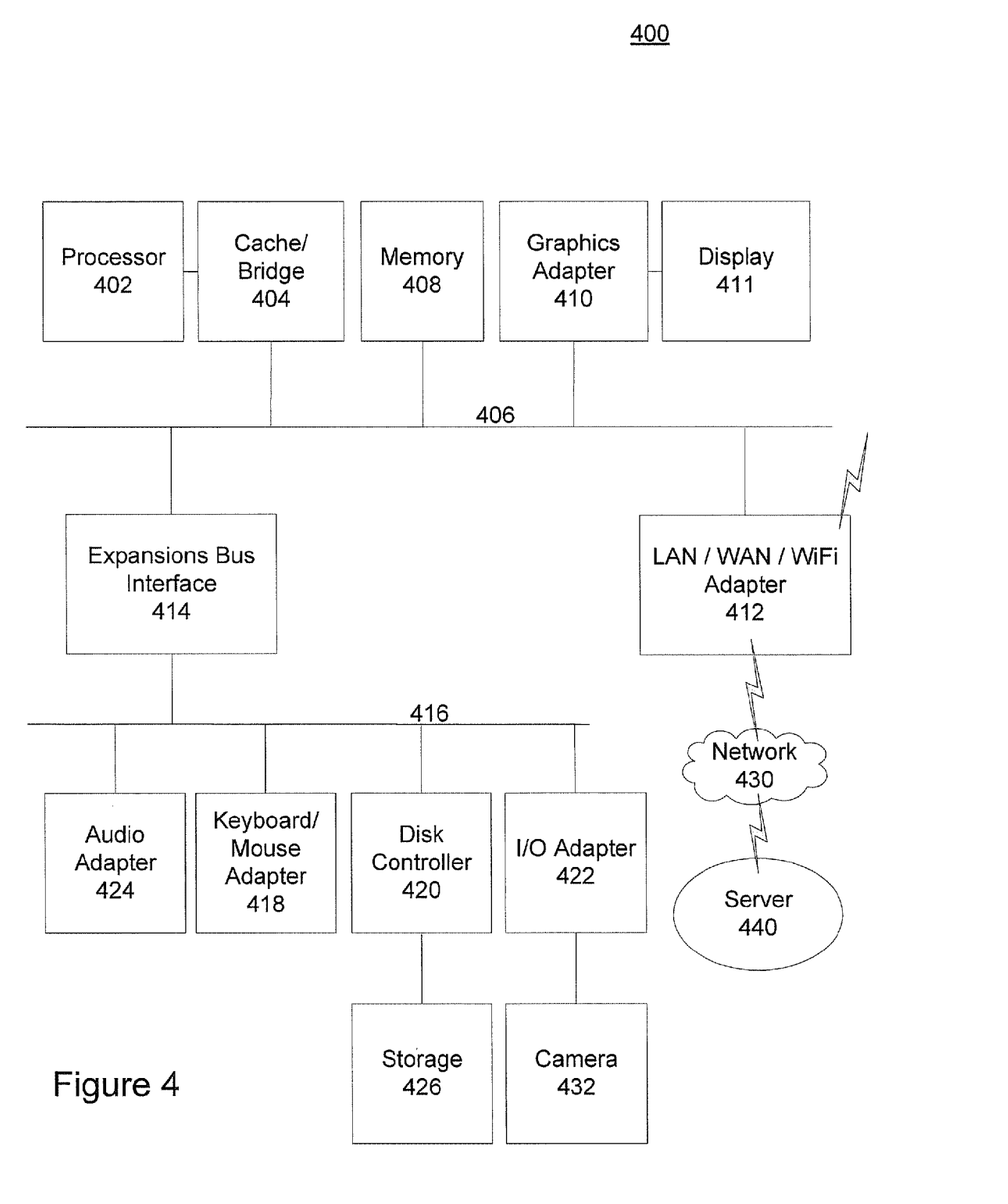
FIG. 4 depicts a block diagram of a data processing system in which an embodiment can be implemented.

FIG. 4 depicts a block diagram of a data processing system 400 in which an embodiment can be implemented, for example as part of a document imaging system, configured to perform processes as described herein. The data processing system 400 includes a processor 402 connected to a level two cache/bridge 104, which is connected in turn to a local system bus 406. The local system bus 406 may be, for example, a peripheral component interconnect (PCI) architecture bus. Also connected to the local system bus 406 in the depicted example are a main memory 408 and a graphics adapter 410. The graphics adapter 410 may be connected to a display 411.

Other peripherals, such as a local area network (LAN)/Wide Area Network/Wireless (e.g. WiFi) adapter 412, may also be connected to the local system bus 406. An expansion bus interface 414 connects the local system bus 406 to an input/output (I/O) bus 416. The I/O bus 416 is connected to a keyboard/mouse adapter 418, a disk controller 420, and an I/O adapter 422. The disk controller 420 can be connected to a storage 426, which can be any suitable machine usable or machine readable storage medium, including but not limited to nonvolatile, hard-coded type mediums such as read only memories (ROMs) or erasable, electrically programmable read only memories (EEPROMs), magnetic tape storage, and user-recordable type mediums such as floppy disks, hard disk drives and compact disk read only memories (CD-ROMs) or digital versatile disks (DVDs), and other known optical, electrical, or magnetic storage devices. The I/O adapter 422 can be connected to any number of input/output devices, including in particular a camera 432, which can be used as camera 216 above, that is capable of taking an image of a document and performing any of the processes described herein. In other cases, the camera 432 can connect to data processing system 400 wirelessly, for example by LAN/Wide Area Network/Wireless adapter 412 or otherwise Also connected to the I/O bus 416 in the example shown is an audio adapter 424, to which sound devices 428 are connected, including in particular a microphone for voice recognition processes. The keyboard/mouse adapter 418 provides a connection for a pointing device (not shown), such as a mouse, trackball, trackpointer, etc.

Those of ordinary skill in the art will appreciate that the hardware depicted in FIG. 4 may vary for particular implementations. For example, other peripheral devices, such as an optical disk drive and the like, also may be used in addition or in place of the hardware depicted. In some embodiments, multiple data processing systems may be connected and configured to cooperatively perform the processing described herein. The depicted example is provided for the purpose of explanation only and is not meant to imply architectural limitations with respect to the present disclosure.

A data processing system in accordance with an embodiment of the present disclosure includes an operating system employing a graphical user interface. The operating system permits multiple display windows to be presented in the graphical user interface simultaneously, with each display window providing an interface to a different application or to a different instance of the same application. A cursor in the graphical user interface may be manipulated by a user through the pointing device. The position of the cursor may be changed and/or an event, such as clicking a mouse button, generated to actuate a desired response.

One of various commercial operating systems, such as a version of Microsoft Windows™, a product of Microsoft Corporation located in Redmond, Wash. may be employed if suitably modified. The operating system is modified or created in accordance with the present disclosure as described.

The LAN/WAN/Wireless adapter 412 can be connected to a network 430 (not a part of data processing system 400), which can be any public or private data processing system network or combination of networks, as known to those of skill in the art, including the Internet. The data processing system 400 can communicate over the network 430 with a server system 440, which is also not part of the data processing system 400, but can be implemented, for example, as a separate data processing system 400.

Data processing system 400 is configured to interact with camera 432 to perform document imaging processes as described herein.

Figure 5:
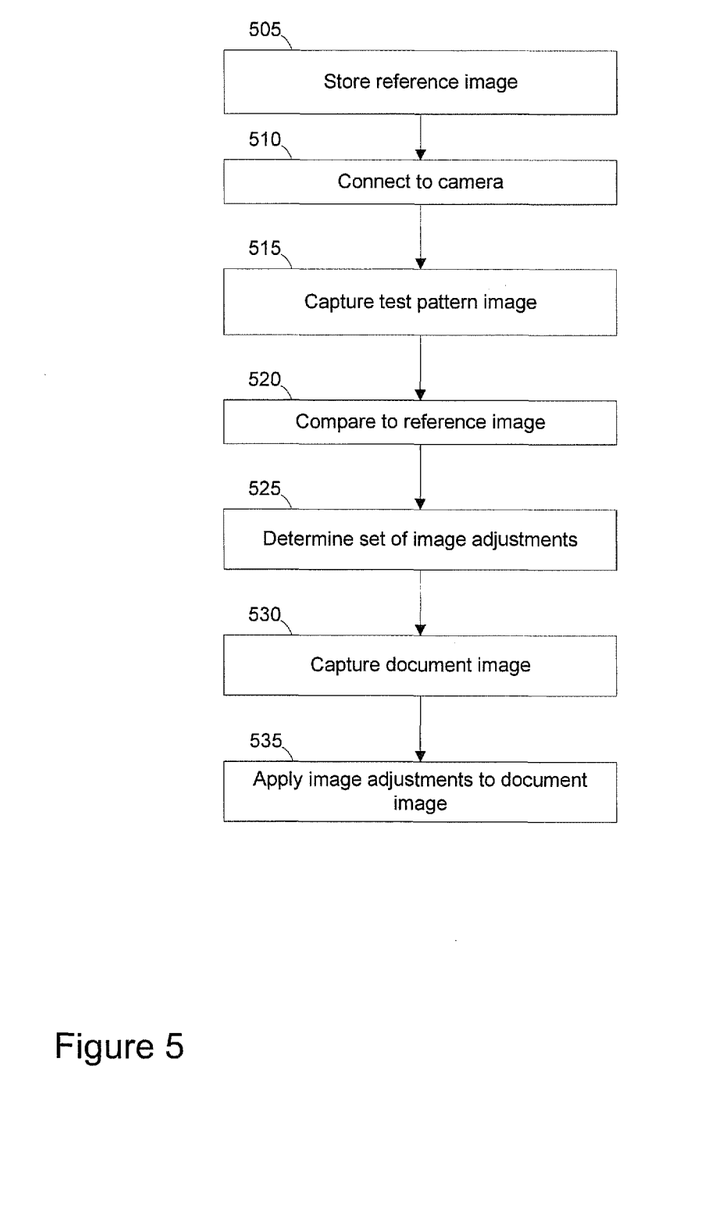
FIG. 5 depicts a flowchart of a process in accordance with disclosed embodiments.

FIG. 5 depicts a flowchart of a process in accordance with disclosed embodiments.

A data processing system, which can be implemented as a data processing system 400, stores a reference image of a test pattern in a memory or other storage (step 505).

The data processing system is connected to a camera, such as camera 432, that is mounted on an apparatus such as apparatus 200 (step 510). The camera is mounted so that it can capture an image of a test pattern on a platen of the apparatus. The test pattern on the platen corresponds to the reference image.

The data processing captures an image, by the camera, of the platen test pattern on a platen of the apparatus (step 515)

The data processing system compares the captured image to the reference image (step 520). Differences between these images will be due to characteristics of the camera and the specific mounting and positioning of the camera on the apparatus.

Based on the comparison, the data processing system determines a set of image adjustments needed to make the captured image correspond accurately to the reference image (step 525). The set includes at least one image adjustment. Adjustments can include any image adjustments known to those of skill in the art, including but not limited to brightness, contrast, sharpness, color, focus, skew, zoom, and others.

The data processing then captures an image, by the camera, of a document placed on the platen of the apparatus (step 530).

The data processing system applies the set of image adjustments to the captured document image to produce a corrected document image (step 535). As part of this step, the data processing system stores and/or displays the corrected document image.

This process provides a distinct technical advantage in that it automatically calibrates the image processing adjustments needed to accurately produce an image of a document, when the specific adjustments needed may change with each different camera used and with each time the apparatus is set up and attached to the camera.

Those skilled in the art will recognize that, for simplicity and clarity, the full structure and operation of all systems and apparatuses suitable for use with the present disclosure is not being depicted or described herein. Instead, only so much of the physical systems as is unique to the present disclosure or necessary for an understanding of the present disclosure is depicted and described. The remainder of the construction and operation of the systems disclosed herein may conform to any of the various current implementations and practices known in the art.

It is important to note that while the disclosure includes a description in the context of a fully functional system, those skilled in the art will appreciate that at least portions of the mechanism of the present disclosure are capable of being distributed in the form of a instructions contained within a machine-usable, computer-usable, or computer-readable medium in any of a variety of fauns, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs). In particular, computer readable mediums can include transitory and non-transitory mediums, unless otherwise limited in the claims appended hereto.

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, or function is an essential element which must be included in the claim scope: the scope of patented subject matter is defined only by the allowed claims. Moreover, none of these claims are intended to invoke paragraph six of 35 USC §112 unless the exact words "means for" are followed by a participle.

What is claimed is:

1. A document imaging apparatus, comprising:
   a base having a platen on a top surface, wherein the platen is permanently printed with a test pattern;
   a boom having a first end and a second end, the first end rotatably connected to the base, the boom movable between at least a first position wherein the second end is above the platen and a second position wherein the boom is stored within the base; and
   a camera mount located at the second end of the boom, the camera mount configured to removably attach to a camera so that the camera is located above the platen and positioned to capture an image of the platen.

2. The apparatus of claim 1, further comprising a document cover that is sized to cover the platen, the document cover fastened at a first end to the base.

3. The apparatus of claim 2, wherein the document cover is a non-glare transparent film.

4. The apparatus of claim 2, wherein the document cover has an end strip across a second end, opposite the first end.

5. The apparatus of claim 2, wherein the document cover has an end strip across a second end, opposite the first end, that magnetically fastens to the base.

6. The apparatus of claim 5, wherein the end strip also magnetically fastens to the boom.

7. The apparatus of claim 2, wherein the document cover is configured to hold a document against the platen so that the document is visible through the document cover.

8. The apparatus of claim 2, wherein the boom and camera mount are configured to position the camera above and orthogonal to the platen.

9. A document imaging system, comprising:
   a data processing system;
   a digital camera in communication with and controlled by the data processing system; and
   an apparatus having a base with a platen on a top surface; a boom having a first end and a second end, the first end rotatably connected to the base, the boom movable between at least a first position wherein the second end is above the platen and a second position wherein the boom is stored within the base; and
   a camera mount located at the second end of the boom, the camera mount configured to removably attach to the camera so that the camera is located above the platen and positioned to capture an image of the platen,
   wherein the digital camera is mounted on the camera mount and positioned to capture an image of a test pattern permanently printed on the platen.

10. The document imaging system of claim 9, wherein the data processing system stores a reference image corresponding to the test pattern.

11. The document imaging system of claim 10, wherein the data processing system is configured to capture an image of the test pattern using the camera.

12. The document imaging system of claim 11, wherein the data processing system is configured to compare the captured image to the reference image.

13. The document imaging system of claim 12, wherein the data processing system is configured to determine a set of image adjustments according to the comparison, and to thereafter apply the image adjustments to captured images of documents.

14. A method, comprising:
   capturing a test pattern image by a data processing system using a digital camera mounted on a document imaging apparatus, the test pattern image permanently printed on a platen of the document imaging apparatus;
   comparing, by the data processing system, the captured test pattern image to a reference image stored in the data processing system;
   determining, by the data processing system, a set of image adjustments based on the comparison;
   capturing a document image by the data processing system using the digital camera mounted on the document imaging apparatus; and applying the set of image adjustments to the captured document image to produce a corrected document image.

* * * * *